United States Patent
Isomura et al.

(10) Patent No.: US 10,762,402 B2
(45) Date of Patent: Sep. 1, 2020

(54) IMAGE CONVERSION DEVICE AND IMAGE CONVERSION METHOD

(71) Applicant: SEIKO EPSON CORPORATION, Tokyo (JP)

(72) Inventors: Masakazu Isomura, Nagano (JP); Kiyoshi Kawai, Nagano (JP); Kohei Utsunomiya, Nagano (JP); Tadashi Hayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/683,409

(22) Filed: Nov. 14, 2019

(65) Prior Publication Data

US 2020/0160128 A1 May 21, 2020

(30) Foreign Application Priority Data

Nov. 16, 2018 (JP) .................. 2018-215182

(51) Int. Cl.
*G06K 15/00* (2006.01)
*G06K 15/02* (2006.01)

(52) U.S. Cl.
CPC ..... *G06K 15/1898* (2013.01); *G06K 15/1836* (2013.01); *G06K 15/1881* (2013.01); *G06K 15/1886* (2013.01)

(58) Field of Classification Search
CPC ........... G06K 15/1898; G06K 15/1881; G06K 15/1886; G06K 15/1836
See application file for complete search history.

(56) References Cited

U.S. PATENT DOCUMENTS

| 8,320,697 B2 * | 11/2012 | Watarai | G06T 5/20 |
| | | | 382/261 |
| 2012/0236337 A1 * | 9/2012 | Shimosato | H04N 1/6022 |
| | | | 358/1.9 |
| 2013/0077102 A1 | 3/2013 | Tomita | |

(Continued)

FOREIGN PATENT DOCUMENTS

| JP | 2013-074509 A | 4/2013 |
| JP | 2014-053819 A | 3/2014 |

*Primary Examiner* — Dung D Tran
(74) *Attorney, Agent, or Firm* — Global IP Counselors, LLP

(57) ABSTRACT

An image conversion device that performs conversion processing on image data before compression processing is performed includes: a pixel designation unit that sequentially designate, as a second pixel, pixels in a raster line that forms the image data in a direction away from a first pixel, which is a pixel included in the raster line, starting from a pixel adjacent to the first pixel in the raster line as a start point of the designation; an evaluation value calculation unit that calculates, as an evaluation value, an absolute value of a difference between pixel values of the first pixel and the second pixel or a square value of the difference; a determination unit that determines whether or not the evaluation value exceeds a predetermined threshold value; and a conversion unit that calculates a representative value of pixel values from the first pixel to a third pixel that is a pixel adjacent to the second pixel at a side of the first pixel and converts the pixel values from the first pixel to the third pixel into the representative value, at a timing at which the evaluation value is determined to exceed the threshold value.

6 Claims, 6 Drawing Sheets

(56) References Cited

U.S. PATENT DOCUMENTS

2013/0272605 A1* 10/2013 Saito ................ G06T 5/002
 382/167
2018/0225798 A1* 8/2018 Ma ................ H04N 1/4072

* cited by examiner

| i − 1 | THRESHOLD VALUE Th[i − 1] |
|---|---|
| 0 | 1024 |
| 1 | 1024 |
| 2 | 576 |
| 3 | 256 |
| 4 | 64 |
| 5 | 16 |
| 6 | 4 |
| 7 | 1 |
| 8 | 0 |

IMAGE CONVERSION DEVICE AND IMAGE CONVERSION METHOD

The present application is based on, and claims priority from JP Application Serial Number 2018-215182, filed Nov. 16, 2018, the disclosure of which is hereby incorporated by reference herein in its entirety.

BACKGROUND

1. Technical Field

The present disclosure relates to an image conversion device and an image conversion method.

2. Related Art

A configuration of an image data conversion unit, in which original image data is converted into gradation data for printing in accordance with a concentration of each pixel and the gradation data for printing is output after compression processing, which includes a standard mode conversion unit that converts the original image data into gradation data for printing with a predetermined number of gradations, a data compression mode conversion unit that converts the original image data into a gradation data for printing with a smaller number of gradations than the predetermined number of gradations, a mode switching unit that selects either data conversion using the standard mode conversion unit and data conversion using the data compression mode conversion unit, and data compression unit that performs compression processing on the gradation data for printing using data conversion in the mode selected by the mode switching unit, is known (see JP-A-2013-74509).

From the viewpoints of high-speed data transfer, reduction of a communication load required for data transfer, high-speed printing processing, and the like, a further increase in compression rate has been required in regard to compression processing of image data. However, it is not easy to modify or expand, for example, an existing compression function implemented on a device that executes compression processing and an existing decoding function implemented on a device, such as a printer, which receives transfer of image data after compression, in order to improve the compression rate of the image data.

SUMMARY

An image conversion device according to an aspect of the present disclosure performs conversion processing on image data before compression processing is performed, and includes: a pixel designation unit that successively designates, as a second pixel, pixels in a raster line that forms the image data in a direction away from a first pixel, which is a pixel included in the raster line, starting from a pixel adjacent to the first pixel in the raster line as a start point of the designation; an evaluation value calculation unit that calculates, as an evaluation value, an absolute value of a difference between pixel values of the first pixel and the second pixel or a square value of the difference; a determination unit that determines whether or not the evaluation value exceeds a predetermined threshold value; and a conversion unit that calculates a representative value of pixel values from the first pixel to a third pixel that is a pixel adjacent to the second pixel at a side of the first pixel at a timing at which the evaluation value is determined to exceed the threshold value and converts the pixel values from the first pixel to the third pixel into the representative value.

BRIEF DESCRIPTION OF THE DRAWINGS

FIG. 4 is a diagram illustrating an example of a threshold value table.

DESCRIPTION OF EXEMPLARY EMBODIMENTS

Hereinafter, embodiments of the disclosure will be described with reference to the respective drawings. Note that the respective drawings are just illustrative examples that explain the embodiments.

1. Description of System Outline

Figure 1:
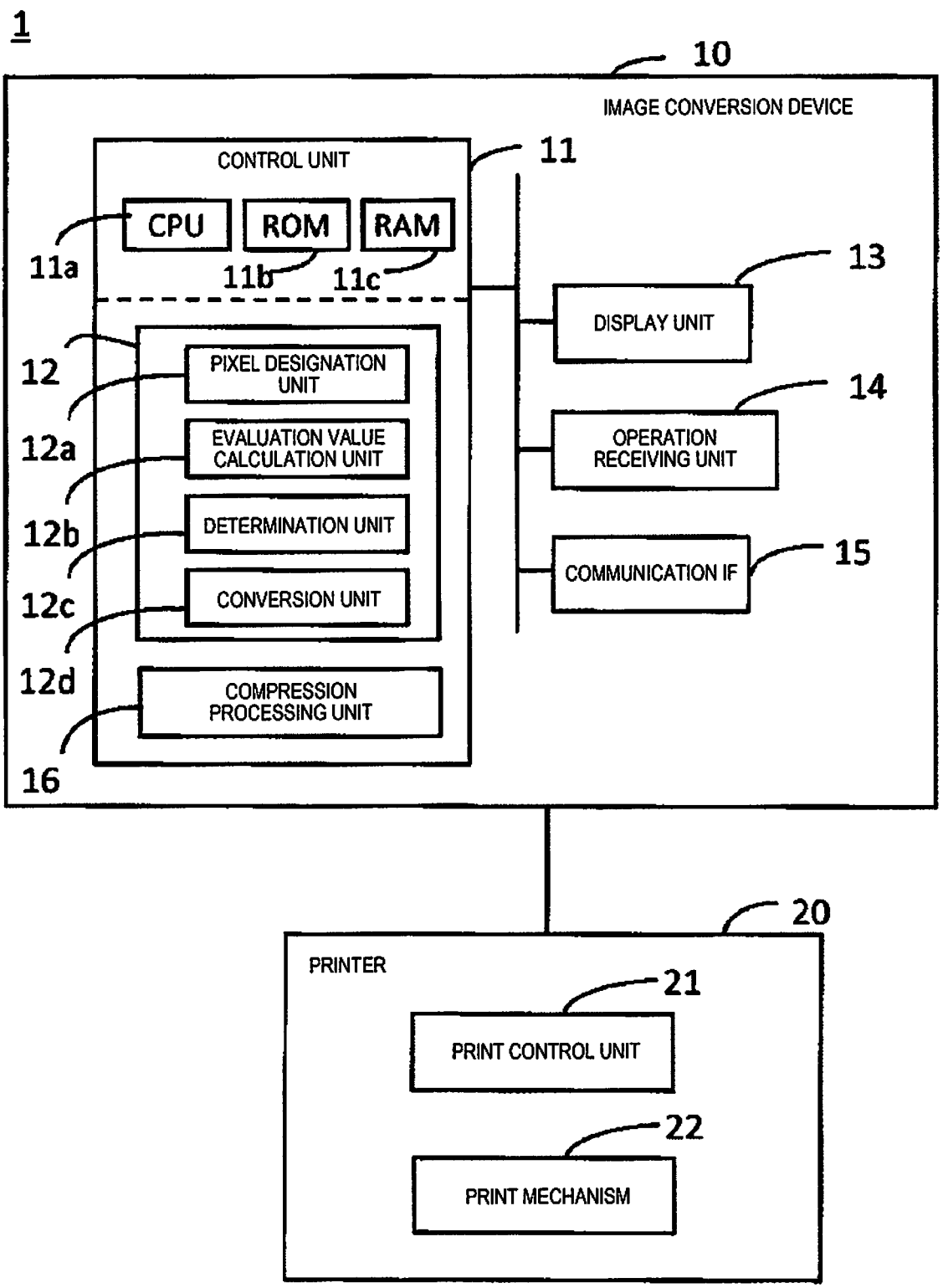
FIG. 1 is a diagram illustrating an outline configuration of a system.

FIG. 1 simply illustrates a configuration of a system 1 according to an embodiment. The system 1 includes an image conversion device 10 and a printer 20. The image conversion device 10 is realized by, for example, a personal computer, a server, a smartphone, a tablet terminal, or an information processing device that has a processing capability that is equivalent to these devices. The image conversion device 10 includes a control unit 11, a display unit 13, an operation receiving unit 14, a communication interface 15, and the like. The interface will be abbreviated as an "IF". The control unit 11 includes one or more ICs that each have a CPU 11a that serves as a processor, a ROM 11b, a RAM 11c, and the like and other non-volatile memory and the like.

The control unit 11 controls the image conversion device 10 by the processor, that is, the CPU 11a executing arithmetic operations in accordance with programs saved in the ROM 11b, another memory, or the like using the RAM 11c or the like as a work area. In the embodiment, the control unit 11 cooperates with the programs and serves as an image conversion unit 12, a compression processing unit 16, and the like. The image conversion unit 12 further has the respective functional units such as a pixel designation unit 12a, an evaluation value calculation unit 12b, a determination unit 12c, and a conversion unit 12d. Note that the processor is not limited to one CPU, and a configuration in which a plurality of CPUs or a hardware circuit such as an application specific integrated circuit (ASIC) performs processing may be employed, or a configuration in which the CPU and the hardware circuit cooperate to perform processing may also be employed.

The "image conversion device" is just a name of a device 10 that realizes at least functions of the image conversion unit 12. In the example illustrated in FIG. 1, the device 10 may be referred to as an image processing device in consideration of the point that the device 10 also serves as the compression processing unit 16, or the device 10 may be referred to as a print control device or the like from the viewpoint that the device 10 controls the printer 20.

The display unit 13 is a mechanism for displaying visual information and includes, for example, a liquid crystal display, an organic EL display, or the like. The display unit 13 may have a configuration including a display and a drive circuit for driving the display. An operation receiving unit 14 is a mechanism for receiving user's operations and is realized by, for example, a physical button, a touch panel, a mouse, a keyboard, or the like. It is a matter of course that the touch panel may be realized as a function of the display unit 13. The display unit 13 and the operation receiving unit 14 can be collectively referred to as an operation panel of the image conversion device 10.

The display unit 13 and the operation receiving unit 14 may be a part of the configuration of the image conversion device 10 or may be peripheral devices that are externally attached to the image conversion device 10. The communication IF 15 is a collective name of one or more IFs for the image conversion device 10 executing wired or wireless communication with the outside in accordance with a predetermined communication protocol including known communication standards. The control unit 11 communicates with the printer 20 via the communication IF 15.

Generally, the printer 20 includes a print control unit 21, a print mechanism 22, and the like. The print control unit 21 is a controller at the side of the printer 20 that includes the ASIC, for example, and generates print data by performing, on image data transferred from the image conversion device 10, processing required in accordance with a state and a format of the image data. The required processing described here means decoding processing performed on image data in a compressed state, so-called color conversion processing performed on image data after decoding, half-tone processing, and the like. The decoding processing will also be referred to as decompression processing.

The print control unit 21 prints an image expressed by the print data on a print medium by controlling the print mechanism 22 based on the print data generated as described above. The print mechanism 22 performs printing on the print medium by, for example, an ink jet scheme or an electrophotographic scheme. The print medium is typically a paper but may be a material other than paper, such as a film or a medium for textile printing, for example.

The image conversion device 10 and the printer 20 may be coupled to each other through a network, which is not illustrated in the drawing. The printer 20 may be a composite machine provided with a plurality of functions, such as a scanner function and a facsimile communication function, as well as the printing function. The image conversion device 10 may be realized not only by an independent information processing device but also by a plurality of information processing devices that are communicably connected to each other via a network.

Figure 2:
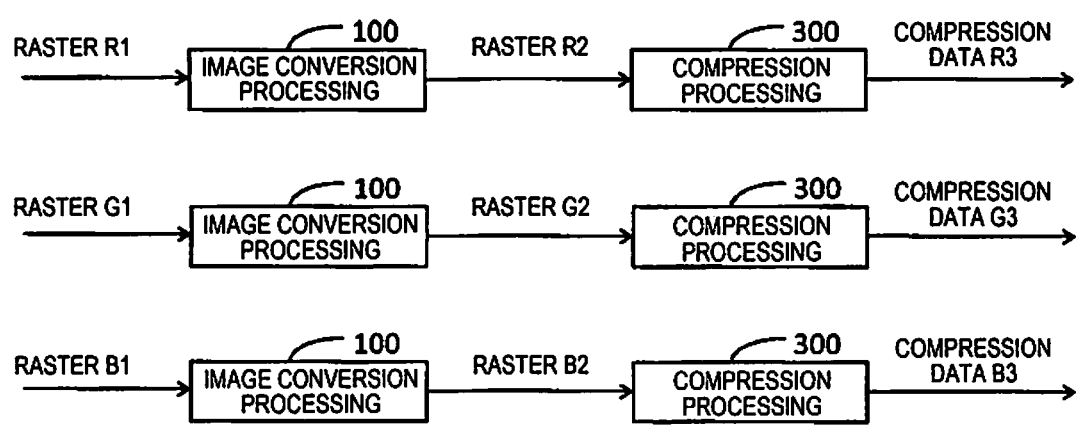
FIG. 2 is a diagram for simply explaining a flow of processing performed on image data.

FIG. 2 is a diagram for simply explaining a flow of processing that the control unit 11 executes on image data as a target of the processing. The image data as a target of the processing is any image data that a user selects by operating the operation receiving unit 14, for example. Now, an example in which image data is bit map data having gradation values of the respective colors, namely, red, green, and blue (RGB) for each pixel will be described. Now the image data may be bit map data having gradation values of the respective colors in another color system, such as cyan, magenta, yellow, and black (CMYK), for each pixel. The gradation value of each color in the image data is expressed by 256 gradations from 0 to 255, for example.

The position of each pixel included in the image data is defined by an XY coordinate system of two axes (an X axis and a Y axis) that perpendicularly intersect with each other. In the image data, a pixel row of a plurality of pixels aligned in a specific direction (X-axis direction) is referred to as a "raster line". Raster R1, raster G1, and raster B1 illustrated in FIG. 2 are the respective raster lines when one raster line is deconstructed for each color. That is, the raster R1 is a raster line in which each pixel has only a gradation value of R, the raster G1 is a raster line in which each pixel has only a gradation value of G, and the raster B1 is a raster line in which each pixel has only a gradation value of B.

As illustrated in FIG. 2, the control unit 11 performs image conversion processing 100 on each of the raster R1, the raster G1, and the raster B1 in a parallel manner. The image conversion processing 100 is processing performed by the image conversion unit 12. The image conversion processing 100 will be described later in detail. Data obtained after the image conversion processing 100 is performed on the raster R1 is raster R2, data obtained after the image conversion processing 100 is performed on the raster G1 is raster G2, and data obtained after the image conversion processing 100 on the raster B1 is raster B2.

The Control unit 11 performs compression processing 300 on each of the raster R2, the raster G2, and the raster B2 in a parallel manner. The compression processing 300 is processing performed by the compression processing unit 16. As the compression processing 300, lossless compression such as a run-length coding method is executed. Data obtained after the compression processing 300 is performed on the raster R2 is compression data R3, data obtained after the compression processing 300 is performed on the raster G2 is compression data G3, and data obtained after the compression processing 300 is performed on the raster B2 is compression data B3.

The control unit 11 transfers the compression data R3, the compression data G3, and the compression data B3 to the printer 20 via the communication IF 15. In this manner, the control unit 11 repeatedly executes the image conversion processing 100 and the compression processing 300 on the image data as a target of the processing in units of raster lines for the respective colors. Therefore, the printer 20 successively acquires the raster lines in which the respective pixels have gradation values of the respective colors by the print control unit 21 decoding the compression data R3, the compression data G3, and the compression data B3 transferred from the image conversion device 10.

2. First Embodiment

Figure 3:
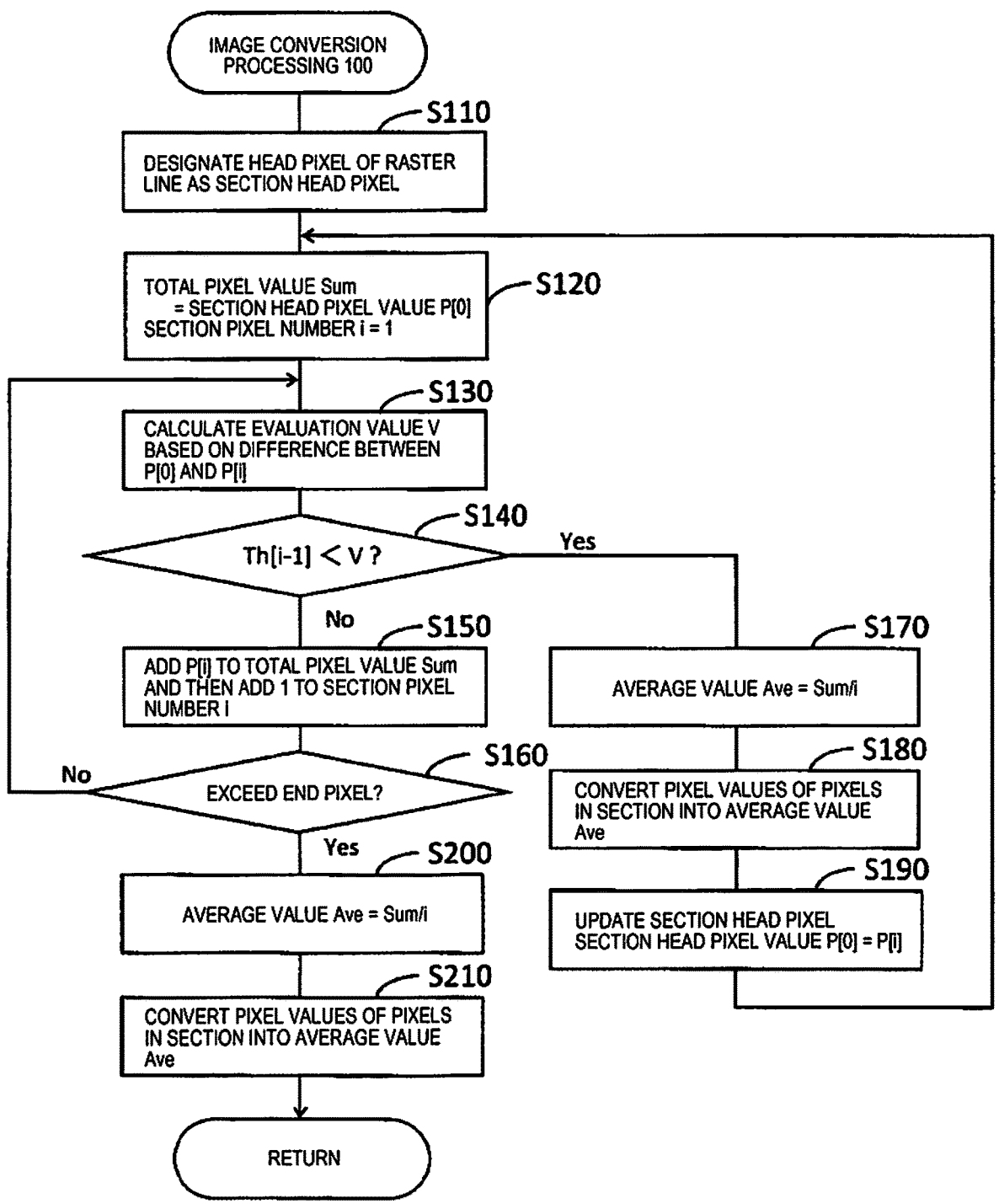
FIG. 3 is a flowchart illustrating details of image conversion processing according to a first embodiment.

The image conversion processing 100 will be described. FIG. 3 illustrates details of the image conversion processing 100 using a flowchart. The embodiment described with reference to FIGS. 3 to 5 will also be referred to as a first embodiment. The image conversion processing 100 performed on each of the raster lines deconstructed from one raster line depending on the respective colors, for example, the raster R1, the raster G1, and the raster B1 illustrated in FIG. 2 has a same procedure. Therefore, the image conversion processing 100 performed on a raster line of any one color among the respective raster lines deconstructed depending on the respective colors will be described.

In Step S110, the pixel designation unit 12a designates a head pixel of the raster line as a head pixel of a conversion target section. The head pixel of the raster line is a pixel with the smallest X coordinate value among pixels included in the raster line. The "conversion target section" is a section in which pixels as targets of conversion in Step S180 or the like, which will be described later, are continued. In FIG. 3, the conversion target section is simply illustrated as a "section". The head pixel of the conversion target section will be referred to as a "section head pixel". The section head pixel corresponds to a "first pixel". That is, the head pixel in the raster line is designated as an initial section head pixel in the raster line in Step S110.

In Step S120, the pixel designation unit 12a sets a total pixel value Sum and a section pixel number i. The "total pixel value Sum" is a sum of pixel values of pixels included in the conversion target section. The pixel values are gradation values that the pixels in the raster line of each color as a target of the image conversion processing 100 have. If the raster line of each color as a target of the image conversion processing 100 is the raster R1, the gradation values of R correspond to the pixel values. The "section pixel number i" is the number of pixels included in the conversion target section.

In Step S120, the pixel designation unit 12a sets the total pixel value Sum=a pixel value P[0] of the section head pixel and sets the section pixel number i=1. The section pixel number i is a number indicating the position of an "evaluation pixel" starting from a pixel adjacent to the section head pixel (i=1) as a start point. The evaluation pixel is a pixel for which a difference between the pixel values thereof and of the section head pixel is evaluated and corresponds to a "second pixel". Therefore, processing of setting the section pixel number i is also processing of designating the evaluation pixel from the pixels included in the raster line. The section pixel number i=1 means that the pixel adjacent to the section head pixel is designated as the evaluation pixel.

In Step S130, the evaluation value calculation unit 12b calculates the evaluation value V based on a difference between the pixel value P[0] of the section head pixel and the pixel value P[i] of the evaluation pixel. Specifically, the evaluation value calculation unit 12b evaluates, as the evaluation value V, an absolute value of a difference between the pixel value P[0] and the pixel value P[i]. Alternatively, the evaluation value calculation unit 12b regards, as the evaluation value V, a square value of the difference between the pixel value P[0] and the pixel value P[i]. Hereinafter, description will be continued on the assumption that the evaluation value V is the square value of the difference between the pixel value P[0] and the pixel value P[i].

In Step S140, the determination unit 12c determines whether or not the evaluation value V calculated in Step S130 exceeds a predetermined threshold value Th[i−1]. The determination unit 12c determines "Yes" and moves on to the processing in Step S170 when the evaluation value V exceeds the threshold value Th[i−1]. Meanwhile, the determination unit 12c determines "No" and moves on to processing in Step S150 when the evaluation value V does not exceed the threshold value Th[i−1].

FIG. 4 illustrates an example of a threshold value table 17 for defining the threshold value Th[i−1]. The threshold value table 17 is information that the control unit 11 can refer to and is stored in advance in a predetermined memory in the control unit 11, for example. In the threshold value table 17, a correspondence between i−1 and the threshold value Th[i−1] is defined. Also, the threshold value Th[i−1] that becomes a smaller value as i−1 increases is defined in the threshold value table 17. The threshold value Th[i−1] may linearly decrease, non-linearly decrease, or decrease in a stepwise manner as i−1 increases.

The determination unit 12c reads a threshold value Th[0]=1024 corresponding to i−1=0 from the threshold value table 17 and compares the threshold value Th[0]=1024 with the evaluation value V in Step S140 when the section pixel number i=1, for example. In the example of the threshold value table 17, it is assumed that all the threshold values Th[i−1] corresponding to i−1>8 are 0. However, it is needless to say that the embodiment is not intended to be interpreted as being limited to the specific numerical values illustrated in the threshold value table 17.

In Step S150, the pixel designation unit 12a adds the pixel value P[i] of the evaluation pixel to the total pixel value Sum and then adds 1 to the section pixel number i. That is, the pixel designation unit 12a increments the section pixel number i. The incrementing of the section pixel number i means designating, as the next evaluation pixel, a pixel adjacent to the evaluation pixel that has been designated until then on a further side from the section head pixel.

In Step S160, the conversion unit 12d determines whether or not the position of the evaluation pixel has exceeded the end pixel of the raster line. The end pixel of the raster line is a pixel with the largest X coordinate value from among the pixels included in the raster line. It is determined that the position of the evaluation pixel has exceeded the end pixel of the raster line when the position adjacent to the end pixel on the further side from the section head pixel, that is, the position at which no pixel is present is designated as the evaluation pixel as a result of incrementing the section pixel number i in Step S150. The conversion unit 12d returns to Step S130 from Step S160 when the position of the evaluation pixel is determined not to have exceeded the end pixel of the raster line. Meanwhile, when the position of the evaluation pixel is determined to have exceeded the end pixel of the raster line, the conversion unit 12d moves on to processing in Step S200 from Step S160.

When such a cycle of Steps S130→S140→S150→S160→S130 is repeated, the pixels in the raster line are successively designated one by one as an evaluation pixel in a direction away from the section head pixel, starting from the pixel adjacent to the section head pixel in the raster line as a start point of the designation. When the evaluation value V calculated in Step S130 is determined not to exceed the threshold value Th[i−1] in Step S140 in a state in which the end pixel of the raster line is designated as an evaluation pixel, the section pixel number i is incremented in Step S150, and the processing proceeds from Step S160 to Step S200.

In Step S170, the conversion unit 12d calculates an "average value Ave" of the pixel values from the section head pixel to the pixel adjacent to the evaluation pixel at the side of the section head pixel. The pixel adjacent to the evaluation pixel at the side of the section head pixel will be referred to as an "immediately previous pixel" with a meaning that the pixel is immediately before the evaluation pixel. The immediately previous pixel corresponds to a "third pixel". That is, the section from the section head pixel to the immediately previous pixel of the raster line is one conversion target section. The conversion unit 12d calculates the average value Ave by dividing the total pixel value Sum by the section pixel number i.

In Step S180, the conversion unit 12d converts the pixel values of the respective pixels in the conversion target section into the average value Ave calculated in Step S170. In this manner, the respective pixels from the section head pixel to the immediately previous pixel have a unified pixel value.

In Step S190, the pixel designation unit 12a updates the section head pixel. In this case, the pixel designation unit 12a designates the evaluation pixel as the next section head pixel. With such updating of the section head pixel, the pixel designation unit 12a deals the pixel value P[i] of the evaluation pixel as the pixel value P[0] of the next section head pixel. The pixel designation unit 12a returns to Step S120 after Step S190.

Note that since the section head pixel and the immediately previous pixel are the same pixel in a situation in which the section pixel number i=1, the pixel included in the conversion target section is only the section head pixel. When "Yes" determination is made in Step S140 in a situation in which the section pixel number i=1, the average value Ave calculated in Step S170=the pixel value P[0] of the section head pixel. Therefore, when "Yes" determination is made in Step S140 in the situation in which the section pixel number i=1, the conversion in Step S180 is not substantially performed, and the pixel value of the conversion target section, that is, the section head pixel is maintained. When "Yes" determination is made in Step S140 in the situation in which the section pixel number i=1, a state in which the pixel values have suddenly varied between the section head pixel and the evaluation pixel adjacent to the section head pixel, that is, a state in which either the section head pixel or the evaluation pixel adjacent to the section head pixel corresponds to an edge in an image has been achieved. In the embodiment, since the pixel value of the section head pixel is maintained, and the edge is held without being blunted when "Yes" determination is made in Step S140 in the situation in which the section pixel number i=1. In this manner, degradation of image quality due to a blunted edge is avoided in the image conversion processing 100.

Steps S200 and S210 may be understood as the same processing as Steps S170 and S180. However, the end pixel of the raster line is regarded as the immediately previous pixel in Steps S200 and S210. That is, the average value Ave calculated in Step S200 is an average value of the pixel values from the section head pixel to the end pixel, and in Step S210, the pixel values of the respective pixels from the section head pixel to the end pixel, which corresponds to the conversion target section, are converted into the average value Ave calculated in Step S200. After the execution of Step S210, the image conversion processing 100 on the raster line ends.

Figure 5:
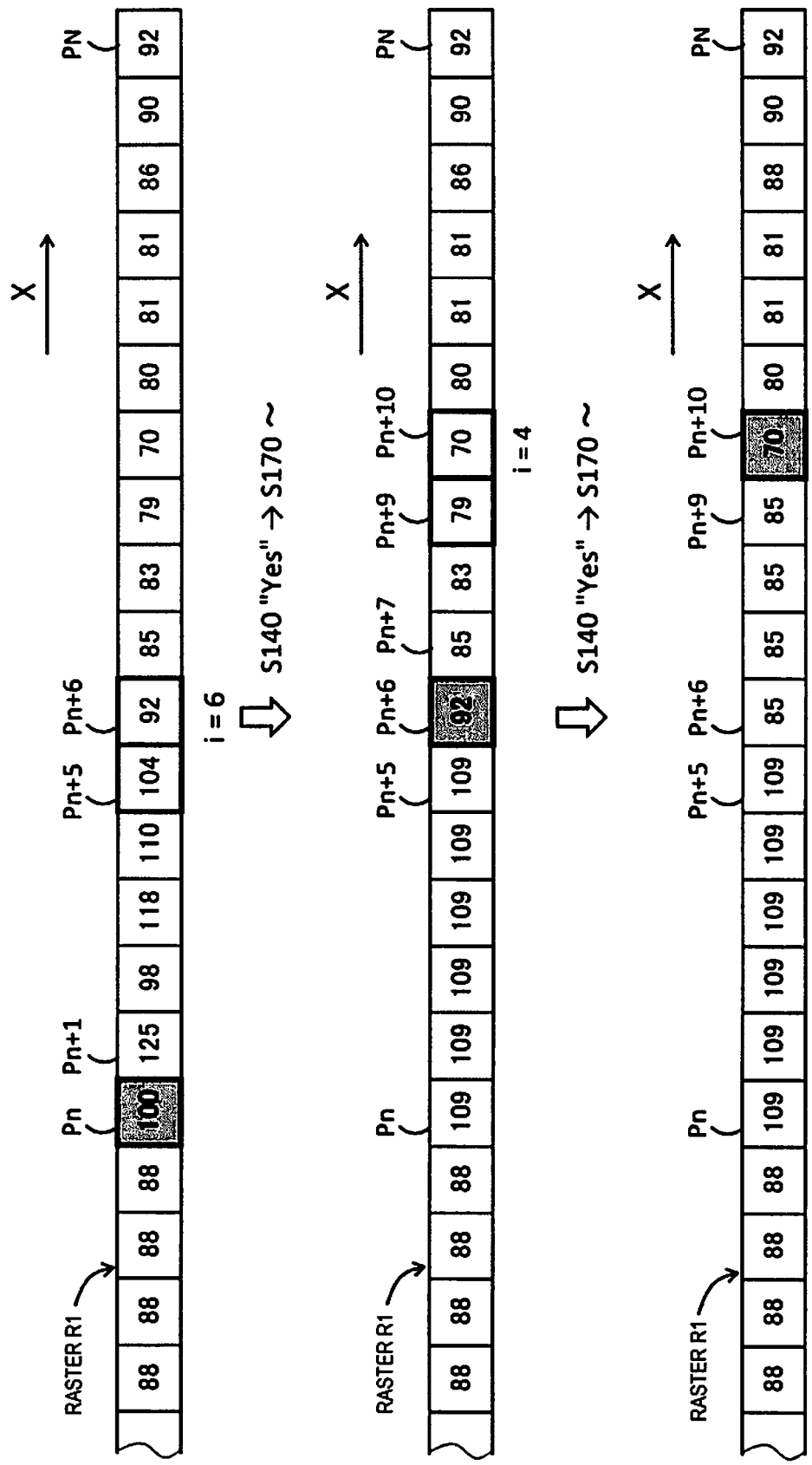
FIG. 5 is a diagram for explaining a specific case of the image conversion processing.

FIG. 5 is a diagram for explaining a specific case of the image conversion processing 100 and illustrates a part of the raster R1 as an example of the raster line. FIG. 5 illustrates a state in which the pixel values of the respective pixels in the raster R1 are converted in the process of the image conversion processing 100. In FIG. 5, the respective rectangles included in the raster R1 correspond to the respective pixels, and the numerical values illustrated in the pixels are the pixel values. It is assumed that the raster line includes N pixels aligned in the X-axis direction. When the head pixel of the raster line is assumed to be the first pixel (the same applies to the following description), the N-th pixel $P_N$ is the end pixel.

It is assumed that in Step S190, which is a specific timing in the image conversion processing 100, the n-th pixel Pn is designated as the section head pixel as illustrated in the upper section in FIG. 5. n<N. In FIG. 5, the pixel that serves as the section head pixel is illustrated with a gray color for easy understanding. In this case, the evaluation pixels are successively designated starting from the n+1-th pixel Pn+1 by the cycle of Steps S130 to S160 being repeated after Step S120. Here, it is assumed that the evaluation value V based on the difference between the pixel value "92" of the evaluation pixel at a timing at which the section pixel number i=6 illustrated in the upper section in FIG. 5, that is, the pixel n+6-th pixel Pn+6 and the pixel value "100" of the section head pixel (pixel Pn) is determined to have exceeded a threshold value Th[5] in Step S140. In this case, the pixel values from the section head pixel (pixel Pn) to the immediately previous pixel, that is the n+5-th pixel Pn+5 are converted into the average value Ave=109 of the pixel values from the section head pixel to the immediately previous pixel through the processing in Steps S170 and S180.

Next, the n+6-th pixel Pn+6, which has been the evaluation pixel until then, is designated as the next section head pixel as illustrated in the middle section in FIG. 5 in Step S190. Thereafter, the evaluation pixel is successively designated as the evaluation pixel starting from the n+7-th pixel Pn+7 by the cycle from Steps S130 to S160 being repeated after Step S120. It is assumed that the evaluation value V based on a difference between the pixel value "70" of the evaluation pixel at a timing at which the section pixel number i=4, that is, the n+10-th pixel Pn+10 and the pixel value "92" of the section head pixel (pixel Pn+6) is then determined to have exceeded a threshold value Th[3] in Step S140 as illustrated in the middle section of FIG. 5. In this case, the pixel values from the section head pixel (Pn+6) to the immediately previous pixel, that is, the n+9-th pixel Pn+9 are converted into the average value Ave=85 of the pixel value from the section head pixel to the immediately previous pixel through the processing in Steps S170 and S180.

Thereafter, the n+10-th pixel Pn+10, which has been the evaluation pixel until then, is designated as the next section head pixel as illustrated in the lower section of FIG. 5, and the processing is similarly repeated in Step S190. Then, data on which the image conversion processing 100 has been executed, that is, the raster R2 is obtained by the conversion being executed on the conversion target section including at least the end pixel (pixel $P_N$) in Step S210 and the image conversion processing 100 performed on the raster R1 ending.

3. Second Embodiment

Figure 6:
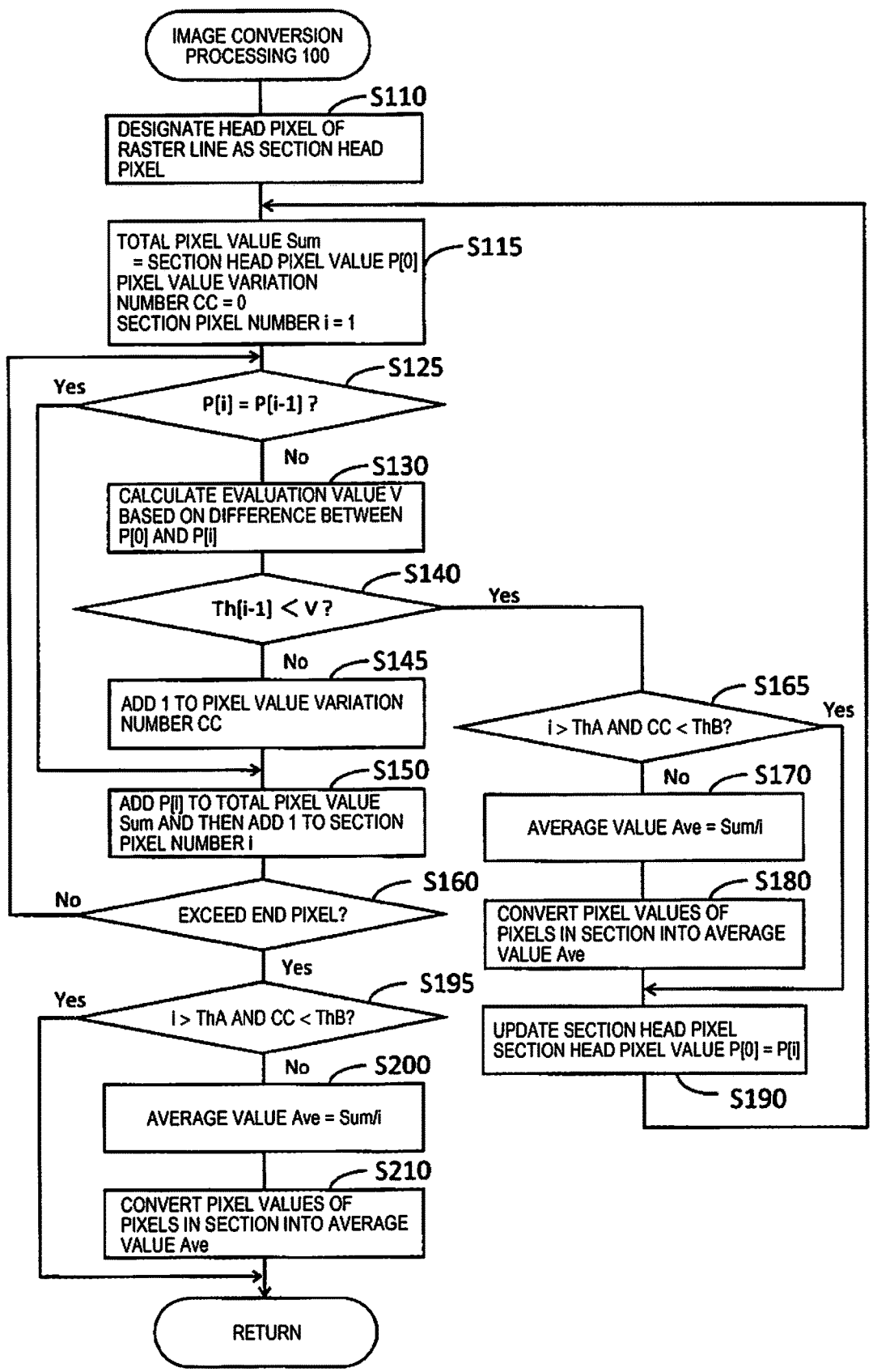
FIG. 6 is a flowchart illustrating details of image conversion processing according to a second embodiment.

Next, a second embodiment will be described. FIG. 6 illustrates details of an image conversion processing 100 according to the second embodiment using a flowchart. In regard to the second embodiment, different points from those of the first embodiment will be described on the assumption of the first embodiment. The flowchart in FIG. 6 is generally different from the flowchart in FIG. 3 in that FIG. 6 includes Steps S115, S125, S145, S165, and S195.

After Step S110, the pixel designation unit 12a performs Step S115. Step S115 is the same as Step S120 in the first embodiment in that the total pixel value Sum and the section pixel number i are set. The pixel designation unit 12a further initializes the pixel value variation number CC and sets the pixel value variation number CC=0 in Step S115. The "pixel value variation number CC" is a value for counting the number of times the pixel values vary among adjacent pixels included in the conversion target section.

In Step S125 after Step S115, the evaluation value calculation unit 12b determines whether or not the pixel value P[i] of the evaluation pixel conforms to the pixel value P[i−1] of the immediately previous pixel. The evaluation value calculation unit 12b determines "Yes" and moves on to Step S150 when the pixel value P[i] conforms to the pixel value P[i−1] while the evaluation value calculation unit 12b determines "No" and moves on to Step S130 when the pixel value P[i] does not conform to the pixel value P[i−1]. When the determination in Step S125 is made in the situation where the section pixel number i=1, the immediately previous pixel is the section head pixel, and the evaluation value calculation unit 12b thus determines whether or not the pixel value P[i] of the evaluation pixel conforms to the pixel value P[0] of the section head pixel.

In Step S140, the determination unit 12c moves on to processing in Step S165 when the evaluation value V exceeds the threshold value Th[i−1] while the determination unit 12c moves on to processing in Step S145 when the evaluation value V does not exceed the threshold value Th[i−1].

In Step S145, the pixel designation unit 12a adds 1 to the pixel value variation number CC. That is, the pixel value variation number CC is incremented. In the second embodiment, the pixel value variation number CC is incremented when the pixel value P[i] of the evaluation pixel differs from the pixel value P[i−1] of the immediately previous pixel and the evaluation value V based on the difference between the pixel value P[i] of the evaluation pixel and the pixel value P[0] of the section head pixel does not exceed the threshold value Th[i−1] in this manner. The pixel designation unit 12a executes Step S150 after Step S145.

In Step S160, the conversion unit 12d returns to Step S125 when the position of the evaluation pixel is determined not to exceed the end pixel of the raster line. Meanwhile, when the position of the evaluation pixel is determined to exceed the end pixel of the raster line, the conversion unit 12d moves on to the processing in Step S195 from Step S160.

In Step S165, the conversion unit 12d determines whether or not a condition that the section pixel number i is greater than a threshold value ThA and that the pixel value variation number CC is smaller than a threshold value ThB is satisfied. This condition will be referred to as a "conversion avoidance condition". Both the threshold values ThA and ThB are preset values. The threshold value ThA corresponds to a "first predetermined number", and the threshold value ThB corresponds to a "second predetermined number". In one example, the threshold value ThA=6, and the threshold value ThB=3. As can be understood from the above description, the section pixel number i is the number of pixels from the section head pixel to the immediately previous pixel. Also, the pixel value variation number CC is the number of times the pixel values change in a section from the section head pixel to the immediately previous pixel, that is, in the conversion target section.

In Step S165, the conversion unit 12d determines "Yes" and moves on to processing in Step S190 when the conversion avoidance condition is satisfied. Meanwhile, when the conversion avoidance condition is not satisfied, the conversion unit 12d determines "No" and executes Step S170. In the second embodiment, the conversion unit 12d does not executes Steps S170 or S180 on a specific conversion target section when the conversion target section includes a relatively large number of pixels and the pixel value variation number CC in the conversion target section is relatively small in this manner.

Determination made in Step S195 is the same as the determination made in Step S165. That is, the conversion unit 12d determines "Yes" and ends the image conversion processing 100 when the conversion avoidance condition is satisfied in Step S195. Meanwhile, when the conversion avoidance condition is not satisfied, the conversion unit 12d determines "No" and executes Step S200.

4. Conclusion

According to the embodiment, the image conversion device 10 performs conversion processing on image data before compression processing is performed in this manner. The image conversion device 10 includes: the pixel designation unit 12a that successively designates, as the second pixel, pixels in a raster line that forms image data in a direction away from a first pixel, which is a pixel included in the raster line, starting from a pixel adjacent to the first pixel in the raster line as a start point of the designation; the evaluation value calculation unit 12b that calculates, as the evaluation value V, an absolute value of a difference between the pixel values of the first pixel and the second pixel or a square value of the difference; the determination unit 12c that determines whether or not the evaluation value V exceeds a predetermined threshold value; and a conversion unit 12d that calculates a representative value of pixels from the first pixel to a third pixel that is a pixel adjacent to the second pixel at the side of the first pixel at a timing at which the evaluation value V is determined to exceed the threshold value, that is, at a timing at which "Yes" determination is made in Step S140 and converts the pixel values from the first pixel to the third pixel into the representative value.

According to the aforementioned configuration, the pixel values of a section in which the pixels whose evaluation values V based on the difference between the pixel values thereof and the pixel value of the first pixel (section head pixel) in the raster line is equal to or less than the threshold value continue from the first pixel at the head are converted into the representative value of the pixels in this section. In this manner, it is possible to reduce the number of colors in units of raster lines that are included in the image data. The number of colors described herein is the number of colors when colors with different gradation values are regarded as one color. The data compression rate in the compression processing 300 that is executed on the raster line is improved by reducing the number of colors in units of raster lines. That is, the data compression rate in the compression processing 300 can be improved as a result by using existing hardware or programs for the compression processing 300 and decoding processing executed at the side of the printer 20 in accordance with the compression processing 300 and executing the image conversion processing 100 according to the embodiment before the compression processing 300. In particular, it is possible to improve the data compression rate in the compression processing 300 by executing the image conversion processing 100 on an image with a large number of colors, such as a natural image, and reducing the number of colors.

High-speed data transfer from the image conversion device 10 to the printer 20 and reduction of a communication burden required for the data transfer are realized by improving the data compression rate in the compression processing 300, and this contributes to high-speed print processing.

The representative values of the pixel values from the first pixel to the third pixel mean the average value Ave of the pixel values from the first pixel to the third pixel according to the above description. For preventing image quality from being degraded, the average value Ave is preferably a value after the conversion of the pixel values from the first pixel to the third pixel. However, the representative value may not be the average value in terms of reduction of the number of colors as described above. The representative value of the pixel values from the first pixel to the third pixel may be either a central value of the pixel values from the first pixel to the third pixel or the pixel values from the first pixel to the third value, for example.

The predetermined threshold value, that is, the threshold value Th[i−1] may be a specific value. However, sensitivity of human vision for identifying differences in grayscale is low with respect to a high-frequency region in which color change cycles are short while the sensitivity tends to be high with respect to a low-frequency region in which color change cycles are long. According to such properties of vision, it is difficult to visually recognize degradation of image quality even if the pixel values in a short pixel section are converted into the representative value. Meanwhile, it becomes easier to visually recognize degradation of image quality when the pixel values in the section are converted into the representative value as the pixel section becomes longer.

Thus, the image conversion unit 12 may reduce the threshold value Th[i−1] in accordance with an increase in distance between the first pixel and the second pixel. According to the threshold value table 17, the threshold value Th[i−1] becomes a smaller value as the distance between the first pixel (section head pixel) and the second pixel (evaluation pixel), that is, the section pixel number i increases. According to the aforementioned configuration, it is possible to more strictly set a condition for extending the length of the section in which the pixel values are converted into the representative value as the section pixel number i increases, and it is thus possible to prevent degradation of image quality due to the decrease in the number of colors in accordance with the properties of vision.

According to the embodiment, the pixel designation unit 12a regards, as the next first pixel, the second pixel at a timing at which the evaluation value V is determined to exceed the threshold value and designates the second pixel starting from the pixel adjacent to the next first pixel in the raster line. That is, Step S120 and the following steps or Step S115 and the following steps are repeated after Step S190 in the flowchart in FIG. 3 or 6. According to the configuration, the section from the first pixel (section head pixel) to the third pixel (immediately previous pixel) is repeatedly set in the raster line, and the number of colors in the raster line can be reduced.

According to the embodiment, the conversion unit 12d calculates the representative value of the pixel values from the first pixel to the end pixel and converts the pixel values from the first pixel to the end pixel into the representative value of the pixel values from the first pixel to the end pixel if the determination unit 12c determines that the evaluation value V calculated when the end pixel of the raster line is designated as the second pixel does not exceed the threshold value, that is, if "Yes" determination is made in Step S160. According to the aforementioned configuration, it is possible to avoid a situation in which the pixel values in a partial section including the end pixel in the raster line cannot be converted into the representative value.

Here, a so-called gradation pattern in which the pixel values change for a number of pixels gotten together to some extent in the raster line is assumed to be an image of a processing target. In the image conversion processing 100 according to the first embodiment, such a gradation pattern has a regular variation in the pixel values, a relatively long section in which a color variation is to be protected in the raster line is thus regarded as one conversion target section, and the pixel values are easily converted into the representative value. Therefore, further arrangement is required in terms of protection of image quality of the gradation pattern.

According to the second embodiment, the conversion unit 12d does not execute the conversion when the number of pixels from the first pixel to the third pixel is greater than the first predetermined number (threshold value ThA) and the number of times of variation in the pixel value (pixel value variation number CC) in the section from the first pixel to the third pixel is smaller than the second predetermined number (threshold value ThB) at the timing at which the evaluation value V is determined to exceed the threshold value. That is, according to the second embodiment, it is possible to exclude the section from the first pixel to the third pixel in the raster line that is a section in which the pixel value variation number CC is relatively small regardless of a large number of pixels from the processing of converting the pixel values in the section into the representative value. In this manner, it is possible to prevent degradation of image quality of the gradation pattern.

It is possible to state that the flowcharts in FIGS. 3 and 6 disclose an image conversion method. Specifically, Step S120 (or Step S115) and S150 correspond to a pixel designation step of designating the second pixel. Also, Step S130 corresponds to an evaluation value calculation step of calculating the evaluation value V, and Step S140 corresponds to a determination step of determining whether or not the evaluation value V exceeds the predetermined threshold value. In addition, Steps S170 and S180 correspond to a conversion step of calculating the representative value and converting the pixel values from the first pixel to the third pixel into the representative value at the timing at which the evaluation value is determined to exceed the threshold value.

In the flowchart in FIG. 3, the end pixel can be designated as the next section head pixel in Step S190. Since substantially no evaluation pixel is present in Step S120 and the following steps that are executed after the end pixel is designated as the section head pixel, the evaluation value calculation unit 12b cannot calculate the evaluation value V in Step S130. Thus, the same determination as that in Step S160 may be executed at a timing after Step S120 and before Step S130 in the flowchart in FIG. 3. That is, the image conversion unit 12 moves on to Step S130 when the position of the evaluation pixel indicated by the section pixel number i is determined not to exceed the end pixel after Step S120. Meanwhile, the image conversion unit 12 may move on to the processing in Step S200 or may end the image conversion processing 100 when the position of the evaluation pixel indicated by the section pixel number i is determined to exceed the end pixel after Step S120.

Similarly, the end pixel can be designated as the next section head pixel in Step S190 in the flowchart in FIG. 6. Since substantially no evaluation pixel is present in Step S115 and the following steps that are executed after the end pixel is designated as the section head pixel, the determination in Step S125 and the calculation of the evaluation value V in Step S130 cannot be performed. Thus, the same determination as that in Step S160 may also be executed at a timing after Step S115 and before Step S125 in the flowchart in FIG. 6. That is, the image conversion unit 12 moves on to Step S125 when the position of the evaluation pixel indicated by the section pixel number i is determined not to exceed the end pixel after Step S115. Meanwhile, the image conversion unit 12 may move on to the processing in Step S195 or may end the image conversion processing 100 when the position of the evaluation pixel indicated by the section pixel number i is determined to have exceeded the end pixel after Step S115.

What is claimed is:

1. An image conversion device that performs conversion processing on image data before compression processing is performed, the device comprising:
   a pixel designation unit that sequentially designates, as a second pixel, pixels in a raster line that forms the image data in a direction away from a first pixel, which is a pixel included in the raster line, starting from a pixel adjacent to the first pixel in the raster line as a start point of the designation;

an evaluation value calculation unit that calculates, as an evaluation value, an absolute value of a difference between pixel values of the first pixel and the second pixel or a square value of the difference;

a determination unit that determines whether or not the evaluation value exceeds a predetermined threshold value; and a conversion unit that calculates a representative value of pixel values from the first pixel to a third pixel that is a pixel adjacent to the second pixel at a side of the first pixel and converts the pixel values from the first pixel to the third pixel into the representative value, at a timing at which the evaluation value is determined to exceed the threshold value.

2. The image conversion device according to claim 1, wherein the threshold value is reduced in accordance with an increase in distance between the first pixel and the second pixel.

3. The image conversion device according to claim 1, wherein the pixel designation unit regards the second pixel at a timing at which the evaluation value is determined to exceed the threshold value as the next first pixel, and designates the second pixel starting from a pixel adjacent to the next first pixel in the raster line as a start point.

4. The image conversion device according to claim 1, wherein the conversion unit does not execute the conversion when the number of pixels from the first pixel to the third pixel is larger than a first predetermined number and the number of variations in pixel values in a section from the first pixel to the third pixel is smaller than a second predetermined number at a timing at which the evaluation value is determined to exceed the threshold value.

5. The image conversion device according to claim 1, wherein if the determination unit determines that the evaluation value calculated when an end pixel in the raster line is designated as the second pixel does not exceed the threshold value, the conversion unit calculates a representative value of pixel values from the first pixel to the end pixel and converts the pixel values from the first pixel to the end pixel into the representative value of the pixel values from the first pixel to the end pixel.

6. An image conversion method of performing conversion processing on image data before compression processing is performed, the method comprising:

a pixel designation step of sequentially designating, as a second pixel, pixels in a raster line that forms the image data in a direction away from a first pixel, which is a pixel included in the raster line, starting from a pixel adjacent to the first pixel in the raster line as a start point of the designation;

an evaluation value calculation step of calculating, as an evaluation value, an absolute value of a difference between pixel values of the first pixel and the second pixel or a square value of the difference;

a determination step of determining whether or not the evaluation value exceeds a predetermined threshold value; and a conversion step of calculating a representative value of pixel values from the first pixel to a third pixel that is a pixel adjacent to the second pixel at a side of the first pixel and converting the pixel values from the first pixel to the third pixel into the representative value at a timing at which the evaluation value is determined to exceed the threshold value.

\* \* \* \* \*